June 7, 1955     I. D. SMITH     2,710,237
LIGHTWEIGHT PISTON CONSTRUCTION
Filed July 15, 1950
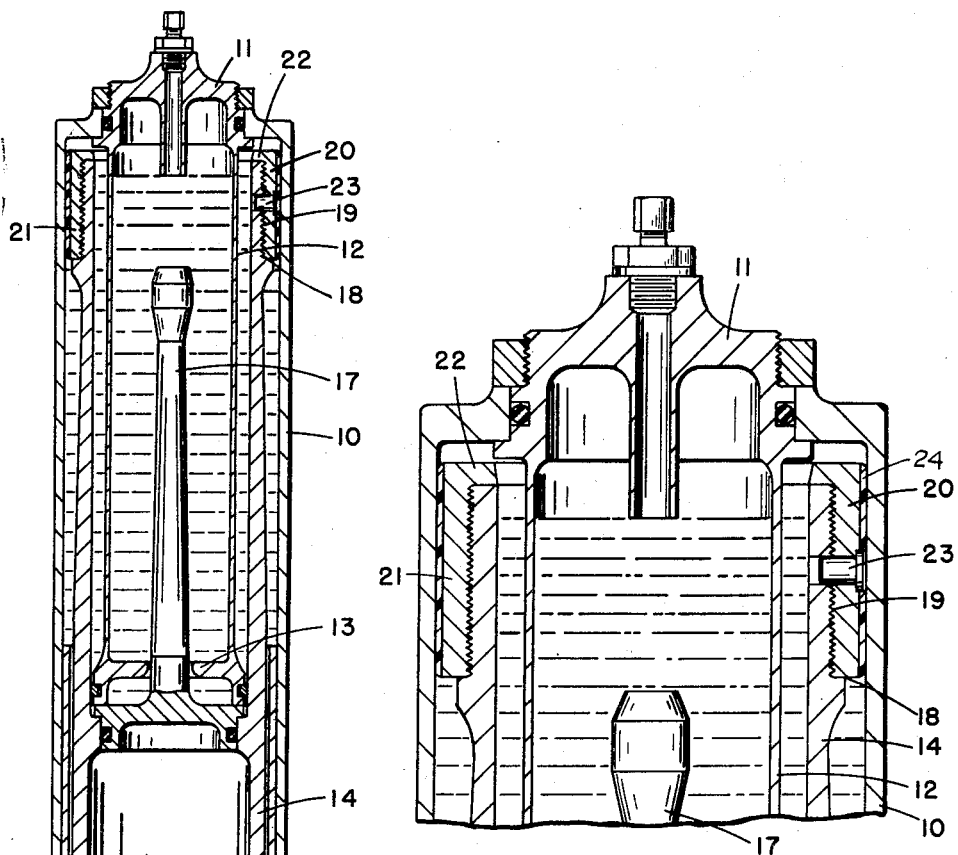
FIG. 2
FIG. 1
INVENTOR.
IRA D. SMITH
BY
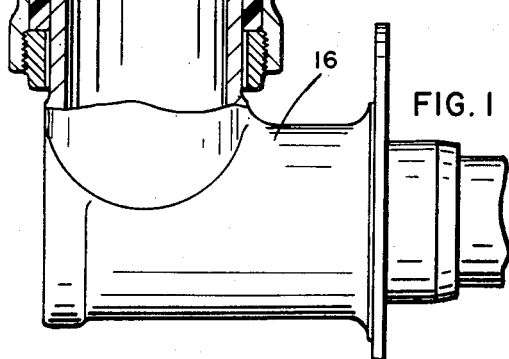
ATTORNEY United States Patent Office 2,710,237
Patented June 7, 1955

2,710,237
LIGHTWEIGHT PISTON CONSTRUCTION

Ira D. Smith, Bedford, Ohio, assignor to The Cleveland Pneumatic Tool Company, Cleveland, Ohio, a corporation of Ohio Application July 15, 1950, Serial No. 174,059

2 Claims. (Cl. 309—4)

This invention pertains broadly to piston construction, but more particularly to the production of a light weight piston capable of resisting the load and wear to which it may be subjected.

In aircraft shock struts, the reciprocating pistons are subjected to high unit pressure which require an excellent bearing material to prevent galling and scoring of the piston and to reduce its wear to a minimum. Heretofore, high strength bronze has been used, but in design of aircraft shock struts where the minimum weight to accomplish the intended purpose is always desirable, the weight of such bronze has been found objectionable.

Lighter material such as aluminum alloys have been found to have sufficient strength but do not hold up well as bearings under the severe conditions encountered in shock struts.

Phenolic material, which is of very light weight, has been found to have very good wearing qualities, low coefficient of friction and to be in fact an excellent bearing material, except that it lacks sufficient shear strength to accommodate the loads to which the piston is subjected, and therefore could not be threaded on the piston tube in the usual manner.

It is therefore an object of this invention to produce a light weight piston having sufficient shear strength to accommodate the loads to which it may be subjected and having good bearing characteristics.

Another object of this invention is to make a piston or the like of light material, such as aluminum alloys, having sufficient strength to carry the loads to which it may be subjected and having its bearing surface made of a different material of light weight and low coefficient of friction, capable of resisting wear and preventing scoring of the piston and cylinder.

Other objects of this invention will be apparent from the following detailed description, wherein similar characters of reference designate corresponding parts and wherein:

Figure 1 is a longitudinal view, partly in section, of a shock absorbing strut embodying the invention.

Figure 2 is an enlarged view of the upper end portion of the strut shown in Figure 1.

In the drawings, 10 represents the external cylinder generally secured to the airplane by any suitable means, not shown, and being closed at its upper end by a head 11. From the head 11 depends a tube 12, which extends partway into the cylinder 10 and is terminated by an orificed plate 13. A piston tube 14 is slidable in the cylinder 10 and protrudes from the lower end thereof through adequate sliding bearing 15 to be attached or welded to a wheel axle 16. Intermediate its ends, the piston tube 14 carries a metering pin 17 slidable through the orificed plate 13 for controlling the flow of the liquid therethrough.

Referring now more particularly to the invention, near its upper end, the piston tube 14 is formed with an annular shoulder 18. From this shoulder to its extreme upper end, it is externally threaded as at 19 to receive an internally threaded piston 20. This piston has a sleeve 21 resting on the shoulder 18 and an inturned flange 22 resting on the extreme end of the piston tube 14. This sleeve and inturned flange form the piston body, which is preferably made of light material having good mechanical strength, such as aluminum or aluminum alloys. To prevent accidental loosening of the piston body on its tube, it is held against relative rotation by a removable cross pin 23.

The outside diameter of the piston body is somewhat smaller than the inside diameter of the cylinder 10, and its cylindrical external face is preferably knurled or serrated to receive a relatively thin layer or coating of good bearing material which after being machined to the proper size, forms a true cylindrical surface or bearing sleeve 24 integrally bonded to the piston body and in sliding fit with the cylinder 10.

The bearing sleeve 24 is preferably made of phenolic material which is of light weight and has excellent bearing qualities. This sleeve extends only on the peripheral wall of the piston, while the load subjected end walls such as 22 and the lower end wall resting on the shoulder 18, are not covered by this phenolic material, and therefore are capable of accommodating the load to which they are subjected.

From the foregoing, it will be understood that by making a piston with a body of light weight material having good mechanical strength and with a bearing sleeve of light weight but good bearing qualities, it is possible to produce a piston assembly of extremely light weight having the combined advantages of good mechanical strength and good bearing qualities. As a result of this invention, materials such as aluminum alloys which have good mechanical strength can now be used in producing light weight pistons without danger of being subjected to excessive wear. With the bearing sleeve made of phenolic material, the piston is capable of resisting wear without necessitating the use of heavier material, such as bronze or the like, heretofore used for bearing material.

The details of structure and arrangement of parts shown and described may be variously changed and modified without departing from the spirit and scope of the invention.

I claim:

1. In a device of the character described, a cylinder, a piston tube slidable in said cylinder, a piston of aluminum alloy screw threaded on the inner end of said tube, means preventing relative rotation between said piston and tube, and a sleeve of phenolic material integrally bonded on the peripheral wall of said piston affording a sliding bearing for said piston with the inner wall of said cylinder.

2. In a device of the character described, a cylinder, a piston tube slidable in said cylinder having an external annular shoulder adjacent its inner end, a sleeve-like piston of aluminum alloy screw threaded on the inner end of said tube with one end abutting against said shoulder, means locking said piston on said tube, and a sleeve of phenolic material integrally bonded on the peripheral wall of said piston and machined to a true cylindrical surface affording a sliding bearing for said piston with the inner wall of said cylinder.

References Cited in the file of this patent

UNITED STATES PATENTS

| | | |
|---|---|---|
| 1,264,871 | Jeffries | Apr. 30, 1918 |
| 1,741,643 | McClure | Dec. 31, 1929 |
| 1,756,205 | Merrick | Apr. 29, 1930 |
| 1,869,041 | Bengston | July 26, 1932 |
| 2,221,121 | Wallace | Nov. 12, 1940 |
| 2,346,658 | Brennan et al. | Apr. 18, 1944 |
| 2,387,181 | Procter | Oct. 16, 1945 |
| 2,410,405 | Cornelius | Nov. 5, 1946 |
| 2,429,426 | Phillips | Oct. 21, 1947 |